March 28, 1961    D. L. RISK ET AL    2,976,806
MISSILE STRUCTURE
Filed March 5, 1958
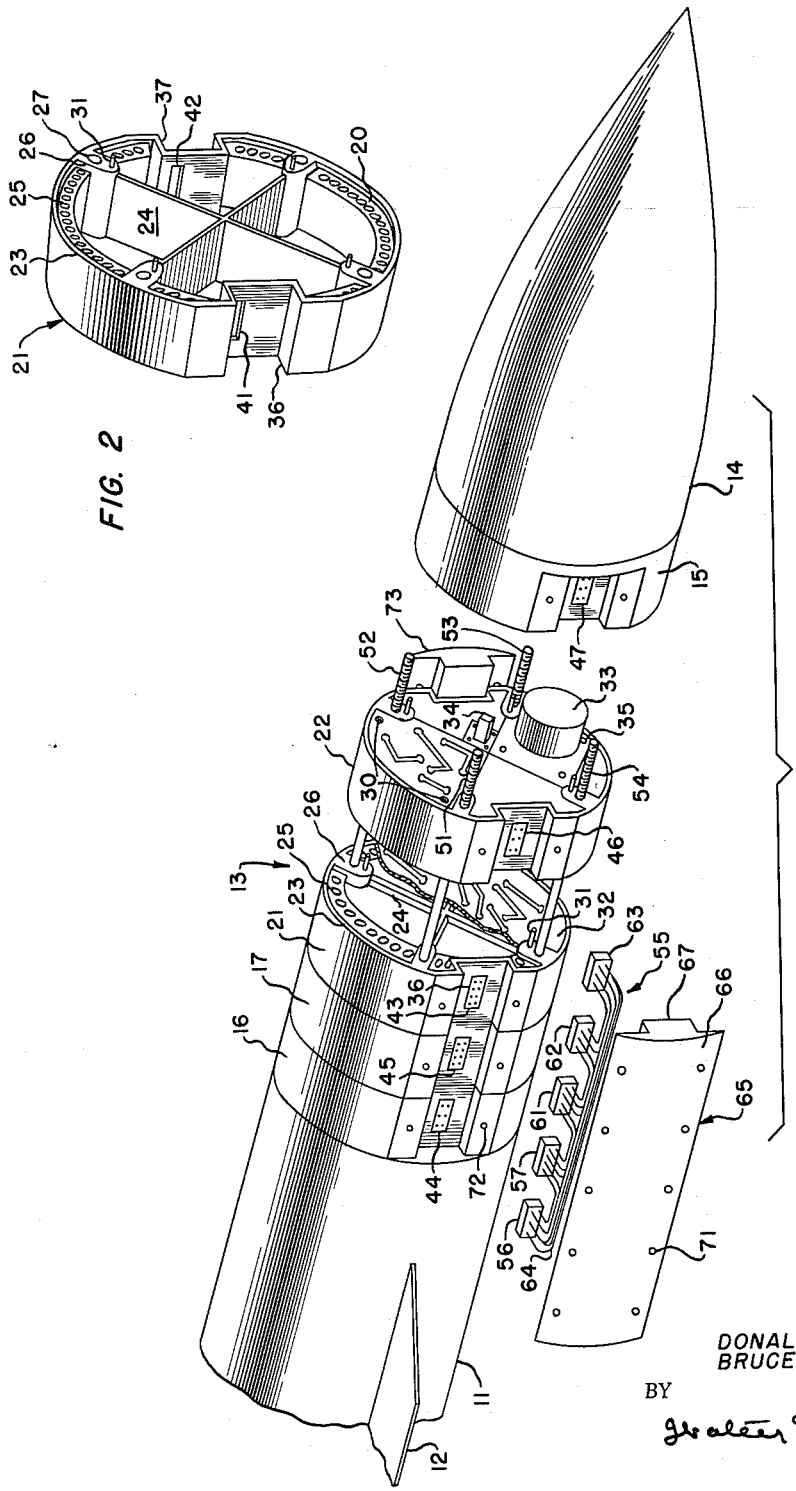
INVENTORS
DONALD L. RISK
BRUCE E. GEDDES
BY
ATTORNEY

United States Patent Office 2,976,806
Patented Mar. 28, 1961

2,976,806

MISSILE STRUCTURE

Donald L. Risk and Bruce E. Geddes, West Covina, Calif., assignors to General Dynamics Corporation, San Diego, Calif., a corporation of Delaware Filed Mar. 5, 1958, Ser. No. 719,346

9 Claims. (Cl. 102—92.5)

This invention relates to a missile structure, and more particularly to a missile structure wherein replaceable electronic chassis of the missile form a load bearing portion of the missile airframe.

The airframes of missiles heretofore known to the art have been constructed in a manner analogous to that employed for construction of manned aircraft. In the prior art, an airframe was constructed in the form of a hollow shell large enough to enclose and support the power plant, fuel, control devices, and the plurality of necessary electronic chassis. Access doors in the airframe were provided for installation, removal and servicing of the electronic chassis. As will be apparent, the airframe was constructed to support the static and dynamic loads due to the electronic chassis in addition to the aerodynamic loads. Further, the necessary access doors required cut-outs in the airframe structure, which necessitated additional reinforcement to carry the loads around the cut-outs. The electronic chassis were required to be strong enough not only to support the electronic components against static and acceleration loads, but also to resist the effects of vibration. A great deal of space was wasted due to the necessary clearance spaces between the various electronic chassis themselves and between the chassis and the missile airframe structure.

In contrast to the structure heretofore employed in connection with missiles, the structure of the present invention enables great reductions of weight and size, increased structural rigidity, ease of production, and flexibility of design. In place of the conventional airframe carrying a plurality of electronic chassis mounted in the interior thereof, the electronic packages form an integral part of the airframe structure. Each electronic package is shaped to conform to the cross-section of the airframe. Exemplarily, in an airframe having a circular cross-section, each electronic package or module comprises a circular, wheel-like frame, the exterior rim of which forms the skin of the airframe, spoke-like webs placed diametrically across the circular frame, and circuit boards and other electronic components attached to the circular frame and to the webs. A plurality of such wheel-like packages or modules may be fastened to one another and to the remainder of the missile with the rims of the modules flush with the skin of the rest of the missile. The structure of the modules may be identical with one another, enabling greater ease of manufacturing, smaller inventories, ease of servicing, lower cost, and greater flexibility of design.

It is, therefore, an object of this invention to provide an improved missile structure.

Another object of this invention is to provide electronic modules which form an integral part of a missile structure.

Another object of this invention is to provide an electronic module which carries missile structural loads.

Another object of this invention is to eliminate duplication of load bearing structural elements in a missile.

Another object of this invention is to provide a missile structure of reduced length, weight, and cost and increased rigidity, serviceability and flexibility.

Other objects and advantages of this invention will become apparent from study of the specification and appended drawings, wherein:

Figure 1 is an exploded view of a missile constructed in accordance with this invention, and Figure 2 is a view of a typical module employed in the missile of Figure 1.

A typical missile incorporating the wheel-like electronic modules of this invention is illustrated in Figure 1. Such a missile may include a body portion 11, a plurality of airfoils such as wing 12, an electronics section 13, and a radome 14 enclosing a radar antenna, positioning servo motors, etc. fastened to a frame 15.

As illustrated in Figure 1, electronics section 13 comprises four modules, 16, 17, 21 and 22. As will be apparent, fewer modules may be employed if the missile requires less electronic equipment, with a saving in weight and missile length, or, conversely, more modules may be employed if more electronic equipment is to be carried by the missile.

The structure of a typical module frame, such as frame 21 illustrated in Figure 2, comprises a substantially circular rim 23. In addition, diametrically placed webs, such as web 24, may be provided. Webs 24 may be integrally formed with rim 23 and fillet 26. A plurality of blocks 20 containing vacuum tube retaining apertures 25 are provided in close thermal contact with the inner surface of circular rim 23. Blocks 20 may be integrally formed with rim 23 if desired. A thickened reinforcing fillet 26 joins web 24 to rim 23. Each reinforcing fillet is perforated by a through-bolt receiving aperture such as 27. A locating stud 31 is formed on one side of fillet 26, and a mating indentation, not shown, is provided on the reverse side of the fillet opposite to the locating stud 31.

A circuit bearing panel 32, preferably a printed, stamped, etched or plated board, is affixed to rim 23 by means of threaded fasteners 30, rivets, bonding or other suitable manner. Additional support to the circuit board may be furnished if necessary by also securing the board to the webs. Small components, such as resistors, capacitors, diodes and transistors may be soldered directly to the circuit board. Heat producing devices such as vacuum tubes are held in apertures 25 in good thermal contact with rim 23 by clips, not shown but of a type well known to the art. Vacuum tube leads may be soldered directly to the circuit on the circuit board, or may be inserted into tube sockets which are secured to the circuit board and electrically connected to the circuit. Heavy circuit components such as transformers, inductors, gyroscopes, etc., may be secured directly to the rim and to the webs. Exemplarily, gyroscope 33 and transformer 34 in module 22 are secured to the webs and rim by means of appropriate threaded fasteners or rivets, such as headed bolt 35.

Each of the module frames is provided with two diametrically opposed stepped indentations in the rim thereof. Exemplarily, frame 21, illustrated by Figure 2, includes stepped indentations 36 and 37. Aperture 41 is provided in indentation 36, and aperture 42 in indentation 37. These apertures are provided to enable mounting electrical receptacles. Thus, receptacle 43, illustrated in Figure 1, is mounted in indentation 36 of module 21. In a similar manner, receptacles 44, 45, 46 and 47 are provided on modules 16, 17, 22 and on frame 15, respectively. Similar receptacles, not shown, are also provided in the indentations such as 37, on the reverse side of each module.

The electronic section modules are assembled to one another by means of four through-bolts 51, 52, 53 and 54 each having one end securely fastened to the body portion 11 of the missile. Each through-bolt, exemplarily bolt 52, passes through a corresponding aperture in a module fillet, exemplarily aperture 27 in fillet 26 of module frame 21. Locating studs, such as 31, cooperating with a mating indentation, not shown, in an adjacent module, enables precise linear relationship between adjacent modules, body 11 and antenna-mounting frame 15. The stacked modules and antenna-mounting frame 15 are secured to one another and to body 11 by nuts, not shown, threaded on the through-bolts and torqued sufficiently to pre-stress the through-bolts. Such pre-stressing provides high rigidity, enabling a high mechanical resonant frequency. It is desirable to have a mechanical resonant frequency well above the frequency range of the missile control system to prevent any possibility of coupling between the two and a resultant harmonic instability of the missile. Electronics section 13 is bolted or otherwise removably secured to body 11.

Circuit interconnections between the modules are made by means of a plug and harness assembly 55. Plugs 56, 57, 61, 62 and 63, mating with receptacles 44, 45, 43, 46 and 47, respectively, are interconnected by conductors in cable 64 of assembly 55 as required by the electronic circuits.

In order to enable service personnel to quickly and easily localize a malfunction to a particular module, circuit test points in suitable receptacles may be mounted in indentations such as indentation 37 on the side of the frame structure opposite the receptacles provided for connecting the plug and harness assembly 55.

A shroud or cover 65 covers the indentations equipped with receptacles 43–47, inclusive, along one side of the assembled modules, along with the installed plug and harness assembly 55. Shroud 65 comprises an outer fairing surface 66 fitting flush with the skin of the missile and modules, and a hollow box inner portion 67 to receive plug and harness assembly 55. Shroud 65 is removably fastened to the modules by means of threaded fasteners (not shown) passing through apertures such as 71 in the shroud and cooperating with tapped holes such as 72 in the module frames. A similar shroud 73 covers the test point receptacles in the indentations on the other side of the module frames. Shrouds 65 and 73 may be formed of metal, or may be of a suitable insulating material. Flush antennas of types well known to the art may also be provided as a portion of shrouds 65 and 73.

The missile structure hereinabove disclosed results in elimination of duplicate structural parts and substantially reduces waste clearance space between parts required by heretofore known electronic module mounting means. Missile weight, length and moment of inertia are thereby reduced, resulting in increased missile speed, range and accuracy. Manufacturing costs are greatly reduced. The standard frame may be extruded or cast. The frame surfaces may be smoothed if desired, and through-bolt holes may be drilled. Automatic manufacturing techniques may be employed to reduce costs further. Mounting electron tubes at the periphery of each module in good thermal contact with the frame permits rapid heat removal and prevents overheating the electronic modules during ground testing. Servicing is greatly simplified as compared with heretofore known structures. Test points are readily accessible to service personnel upon removal of shroud 73. Replacement of defective modules requires removal of four nuts threaded on through-bolts 51, 52, 53 and 54, slipping out the defective module and substitution of a good one.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. In a missile structure, an electronics section including a plurality of modules, each of said modules comprising a substantially circular frame having an outer surface flush with the outer surface of said missile structure, a web connecting opposite interior sides of said circular frame, fillets at the junctions of said web and said circular frame, means for fastening electronic circuit components to said web and said frame, and securing means cooperating with said fillets for mechanically fastening said modules to one another, thereby forming a load bearing portion of said missile structure.

2. In a missile structure, an electronics section including a plurality of modules, each of said modules comprising a substantially circular frame having an outer surface flush with the outer surface of said missile structure, a web connecting opposite interior sides of said circular frame, fillets at the junctions of said web and said circular frame, means for securing heat producing devices in thermal contact with said frame, and securing means cooperating with said fillets for mechanically fastening said modules to one another, thereby forming a load bearing portion of said missile structure.

3. In a missile structure, an electronics section including a plurality of modules, each of said modules comprising a substantially circular frame having an outer surface flush with the outer surface of said missile structure, a web connecting opposite interior sides of said circular frame, fillets at the junctions of said web and said circular frame, means for securing heat producing devices in thermal contact with said frame, means for fastening an electronic circuit panel to said web and said frame, and securing means cooperating with said fillets for mechanically fastening said modules to one another, thereby forming a load bearing portion of said missile structure.

4. In a missile structure, an electronics section including a plurality of modules, each of said modules comprising a substantially circular frame having an outer surface flush with the outer surface of said missile structure, a web connecting opposite interior sides of said circular frame, fillets at the junctions of said web and said circular frame, apertured blocks for mounting heat producing devices in thermal contact with said frame, means for fastening an electronic circuit panel to said web and said frame, and through bolts cooperating with said fillets for mechanically fastening said modules to one another, thereby forming a load bearing portion of said missile structure.

5. In a missile structure, an electronics section including a plurality of modules, each of said modules comprising a substantially circular frame having an outer surface flush with the outer surface of said missile structure, webs opposite interior sides of said circular frame, fillets at the junctions of said webs and said circular frame, apertured blocks for mounting heat producing devices in thermal contact with said frame, an electronic circuit board, means for fastening said electronic circuit board to said webs and said frame, an indentation in the outer surface of said circular frame, an electrical receptacle having a plurality of contacts connected to said circuit board and mounted in said indentation, a shroud for covering said indentation, and securing means cooperating with said fillets for mechanically fastening said modules to one another, thereby forming a load bearing portion of said missile structure.

6. In a missile structure, an electronics section including a plurality of modules, each of said modules comprising a substantially circular frame having an outer surface flush with the outer surface of said missile structure, webs integral with said circular frame and connecting opposite interior sides of said circular frame, fillets at the junctions of said webs and said circular frame, apertured blocks for mounting heat producing devices in thermal contact with said frame, an electronic circuit board, means for fastening said electronic circuit board to said webs and said frame, an indentation in the outer surface of said circular frame, an electrical receptacle having a plurality of contacts connected to said circuit board and mounted in said indentation, cable means electrically interconnecting receptacles in a plurality of said modules, a shroud for covering said indentation, and securing means cooperating with said fillets for mechanically fastening said modules to one another, thereby forming a load bearing portion of said missile structure.

7. In a missile structure, an electronics section including a plurality of modules, each of said modules comprising a substantially circular frame having an outer surface flush with the outer surface of said missile structure, webs integral with said circular frame and connecting opposite interior sides of said circular frame, fillets at the junctions of said webs and said circular frame, apertured blocks for mounting heat producing devices in thermal contact with said frame, an electronic circuit board, circuit components, means for mounting said circuit components on said circuit board, means for fastening said electronic circuit board to said webs and said frame, an indentation in the outer surface of said circular frame, an electrical receptacle having a plurality of contacts connected to said circuit board and mounted in said indentation, cable means electrically interconnecting receptacles in a plurality of said modules, a shroud for covering said indentation, and securing means cooperating with said fillets for mechanically fastening said modules to one another, thereby forming a load bearing portion of said missile structure.

8. In a missile structure, an electronics section including a plurality of modules, each of said modules comprising a substantially circular frame having an outer surface flush with the outer surface of said missile structure, webs integral with said circular frame and connecting opposite interior sides of said circular frame, fillets at the junction of said webs and said circular frame, apertured blocks for mounting heat producing devices in thermal contact with said frame, an electronic circuit board, light and heavy electronic circuit components, means for mounting said light circuit components on said circuit board, means for fastening said electronic circuit board to said webs and said frame, means for mounting said heavy electronic circuit components to said web, an indentation in the outer surface of said circular frame, an electrical receptacle having a plurality of contacts connected to said circuit board and mounted in said indentation, cable means electrically interconnecting receptacles in a plurality of said modules, a shroud for covering indentation, and securing means cooperating with said fillets for mechanically fastening said modules to one another, thereby forming a load bearing portion of said missile structure.

9. In a missile structure, an electronics section including a plurality of modules, each of said modules comprising a substantially circular frame having an outer surface flush with the outer surface of said missile structure, webs integral with said circular frame and connecting opposite interior sides of said circular frame, fillets at the junctions of said webs and said circular frame, apertured blocks for mounting heat producing devices in thermal contact with said frame, an electronic circuit board, means for fastening said electronic circuit board to said webs and said frame, a first indentation in the outer surface of said circular frame, a first electrical receptacle having a plurality of contacts connected to said circuit board and mounted in said first indentation, a second indentation in the outer surface of said circular frame, a second electrical receptacle having a plurality of contacts connected to said circuit board and mounted in said second indentation, a second shroud for covering said second indentation, and a through bolt cooperating with each of said fillets for mechanically fastening said modules to one another, thereby forming a load bearing portion of said missile structure.

References Cited in the file of this patent
UNITED STATES PATENTS

| | | |
|---|---|---|
| 2,754,454 | McNutt et al. | July 10, 1956 |
| 2,779,282 | Raffel | Jan. 29, 1957 |
| 2,803,788 | Sanders | Aug. 20, 1957 |
| 2,824,537 | Boyle | Feb. 25, 1958 |
| 2,853,038 | Hess et al. | Sept. 23, 1958 |